UNITED STATES PATENT OFFICE.

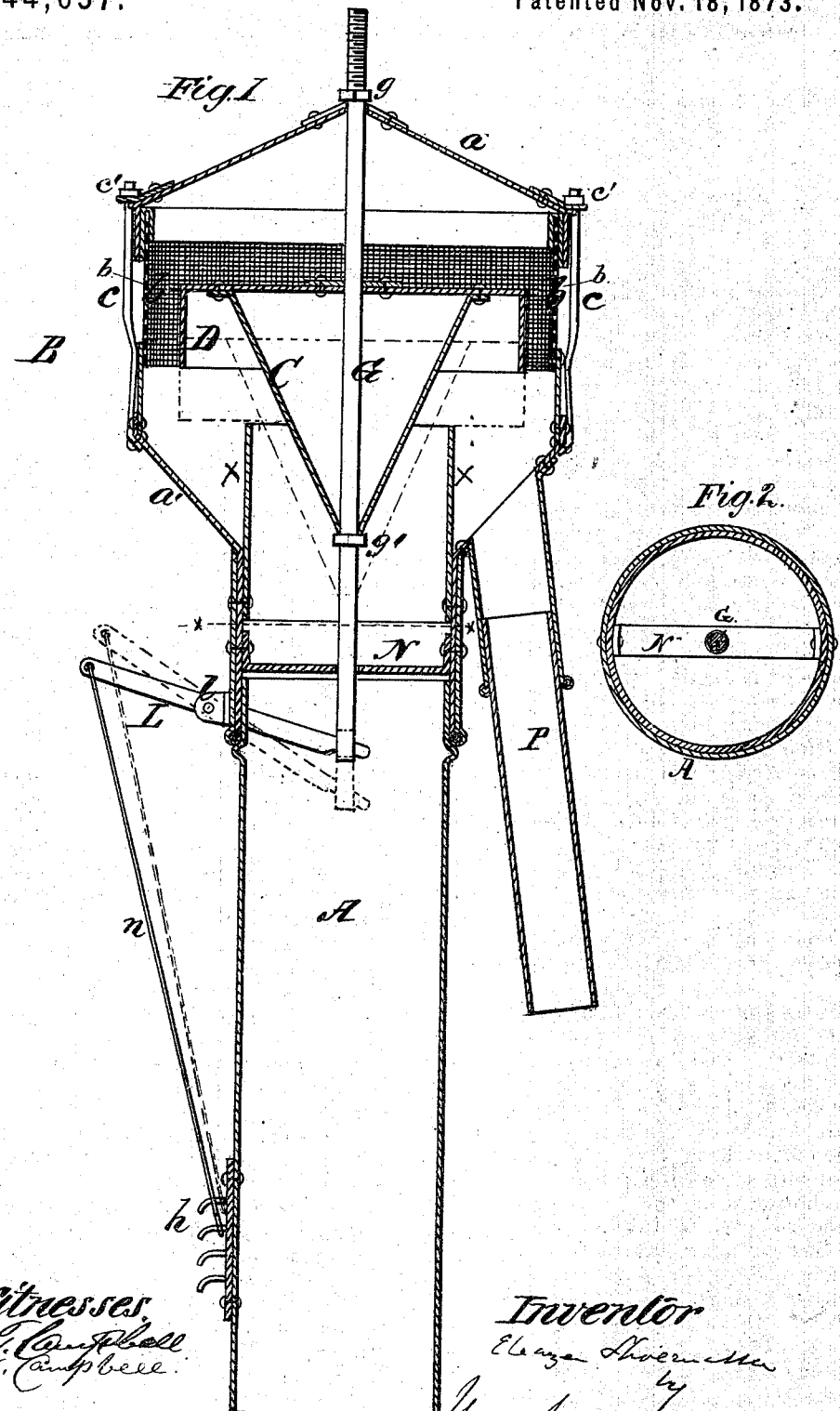

ELEAZER SHOEMAKER, OF MELMORE, OHIO.

IMPROVEMENT IN SPARK ARRESTERS AND CONDUCTORS.

Specification forming part of Letters Patent No. 144,637, dated November 18, 1873; application filed September 8, 1873.

*To all whom it may concern:*

Be it known that I, ELEAZER SHOEMAKER, of Melmore, in the county of Seneca and State of Ohio, have invented a new and Improved Spark-Arrester and Conductor; and I do hereby declare that the following is a full, clear, and exact description thereof, reference being had to the accompanying drawing, making part of this specification, in which—

Figure 1 represents a diametrical section of my improvements applied to a locomotive smoke-stack; Fig. 2, a horizontal section in the line $x\,x$.

This invention relates to improvements on spark-arresters, which are applicable to the chimneys of stationary furnaces, as well as to the stack of locomotives. It consists in a double conical head, which is made partly of wire-gauze, as will be hereinafter explained, and in which an adjustable inverted and conical spreader is applied for uniformly spreading the sparks and cinders as they leave the top of the stack; also, in applying to the conical spreader an annular flange, which will prevent the sparks and cinders striking against the wire-gauze of the stack-head, and which will direct the sparks and cinders downward outside of the stack, and upon the bottom of the head, whence they will escape through a pipe leading therefrom, as will be hereinafter explained.

The following description of my invention will enable others skilled in the art to understand it.

In the accompanying drawings, A represents the smoke-stack of a locomotive, and B represents the double-conical head thereon, which latter may be made of any suitable diameter and height. This head has a cylindrical wall, $b$, of woven wire, for allowing the passage of air through it, which wall is constructed with a conical top, $a$, and an inverted conical bottom, $a'$. The two cones are confined on their wire-gauze wall by means of rivets, vertical bolts $c$, and nuts $c'$. The lower end of the conical bottom $a'$ is riveted around the stack A a short distance below its upper end, so that a portion, $x$, of the stack rises above the said conical bottom $a'$, to prevent sparks which fall thereon returning into the stack again. From this conical bottom $a'$ a pipe, P, descends, for carrying off the sparks and cinders, which may be discharged into a metallic box containing water. C represents an inverted cone, which is rigidly secured to a vertical rod, G, that passes centrally through the cone, and through the cone and the top of the head B, receiving on it a nut, $g$. Below the centrally-arranged cone the rod G is guided by a narrow cross-bar, N, and through the lower end of this rod one end of a lever, L, passes loosely for adjusting the cone up and down. The lever L extends through the stack A, and has its fulcrum at $l$, and to the outer end of this lever a rod, $n$, with a loop on its lower end, is attached.

By means of the rod $n$ a person can raise or depress the cone C to regulate the draft of the furnace; or, if desired, the draft can be completely shut by lowering the cone upon the upper end of the stack, will catch the loop on rod $n$, and hold the cone at any desired point of adjustment. Surrounding the base of the cone C is a flange, D, of such diameter and depth as that will serve as a shield for the ascending sparks to strike against, and then direct the sparks downward upon the bottom of the head B, from which they will be carried off by the pipe P. The cone C uniformly spreads the rising sparks and cinders, and the flange D prevents them from striking against the gauze-wall $b$.

It will be seen from the drawings, that the base of the cone C and its flange D are of greater diameter than the top of the stack A; consequently the sparks and cinders after striking against said flange will not fall back into the stack.

To prevent the possibility of the sparks which drop down upon the portion $a'$ hanging to those sides where there is no discharge-tube, I shall make the whole of the portion $a'$ to slant or converge toward the discharge-passage.

Having described my invention, what I claim as new, and desire to secure by Letters Patent, is—

The inverted cone C, provided with the short cylindrical flange D, and applied upon the vertically-adjustable rod G, in combination with the smoke-stack A, provided with the cylindrical head B, conical directing surfaces $a\,a'$, perforated surface $b$, extension $x\,x$, and discharge-pipe P, all substantially in the manner and for the purpose described.

ELEAZER SHOEMAKER.

Witnesses:
 NELSON B. LUTES,
 HARRISON NOBLE.